United States Patent
Xu et al.

(10) Patent No.: US 12,011,689 B2
(45) Date of Patent: Jun. 18, 2024

(54) SYSTEM AND METHOD FOR PROCESSING INDUSTRIAL WASTE GAS BASED ON COMBINATION OF PHOTOELECTROCATALYSIS AND BIOTRICKLING FILTER

(71) Applicant: YANCHENG INSTITUTE OF TECHNOLOGY, Jiangsu (CN)

(72) Inventors: Qi Xu, Jiangsu (CN); Yue Li, Jiangsu (CN); Bairen Yang, Jiangsu (CN); Jia Gao, Jiangsu (CN); Qingqing Shang, Jiangsu (CN)

(73) Assignee: YANCHENG INSTITUTE OF TECHNOLOGY, Yancheng (CN)

( * ) Notice: Subject to any disclaimer, the term of this patent is extended or adjusted under 35 U.S.C. 154(b) by 736 days.

(21) Appl. No.: 17/151,920

(22) Filed: Jan. 19, 2021

(65) Prior Publication Data
US 2021/0331116 A1   Oct. 28, 2021

(30) Foreign Application Priority Data
Apr. 28, 2020   (CN) .......................... 202010348433.1

(51) Int. Cl.
| | | |
|---|---|---|
| *B01D 53/85* | (2006.01) | |
| *B01D 53/00* | (2006.01) | |
| *B01D 53/32* | (2006.01) | |
| *B01D 53/86* | (2006.01) | |

(52) U.S. Cl.
CPC .......... *B01D 53/85* (2013.01); *B01D 53/007* (2013.01); *B01D 53/326* (2013.01); *B01D 53/8687* (2013.01); *B01D 2251/95* (2013.01); *B01D 2255/40* (2013.01); *B01D 2255/802* (2013.01); *B01D 2257/708* (2013.01); *B01D 2258/02* (2013.01)

(58) Field of Classification Search
CPC ........ B01D 2255/802; B01D 2255/806; B01D 53/85; B01D 53/8687; B01D 2259/818; B01D 53/86; B01D 53/84; B01D 53/75; B01D 53/74; B01D 53/007
See application file for complete search history.

(56) References Cited

FOREIGN PATENT DOCUMENTS

| | | | | |
|---|---|---|---|---|
| CN | 101077472 A | * | 11/2007 | |
| CN | 101244850 A | * | 8/2008 | |
| CN | 107362679 A | * | 11/2017 | ......... B01D 53/8687 |
| CN | 107583425 A | | 1/2018 | |
| CN | 108529714 A | | 9/2018 | |
| CN | 108744947 A | | 11/2018 | |
| DE | 102012000206 A1 | * | 4/2013 | ......... B01D 53/0462 |
| KR | 20070001387 A | * | 1/2007 | |

* cited by examiner

*Primary Examiner* — Elizabeth A Robinson
*Assistant Examiner* — Jonathan E Lepage

(57) ABSTRACT

A system and method for processing industrial waste gas based on a combination of photoelectrocatalysis and a biotrickling filter, including an industrial waste gas simulation generator, a photoelectrocatalytic reactor and at least one biotrickling filter. The industrial waste gas simulation device transports the industrial waste gas to the photoelectrocatalytic reactor through the buffer tank and the mixing tank by a fan. Then the industrial waste gas is degraded under the synergistic catalysis of the substances with high catalytic activity generated by the plasma reactor and the photocatalyst activated by the ultraviolet lamp.

7 Claims, 3 Drawing Sheets

SYSTEM AND METHOD FOR PROCESSING INDUSTRIAL WASTE GAS BASED ON COMBINATION OF PHOTOELECTROCATALYSIS AND BIOTRICKLING FILTER

CROSS-REFERENCE TO RELATED APPLICATIONS

This application claims the benefit of priority from Chinese Patent Application No. 202010348433.1, filed on Apr. 28, 2020. The content of the aforementioned application, including any intervening amendments thereto, is incorporated herein by reference in its entirety.

TECHNICAL FIELD

This application relates to environmental protection, and more particularly to a system and method for processing industrial waste gas based on a combination of photoelectrocatalysis and a biotrickling filter (BTF).

BACKGROUND

The rapid development of industrial society brings increasing pollution of volatile organic compounds (VOCs), and extensive researches have recently been conducted on the control and treatment of VOCs. Currently, the VOCs are treated mainly by a biological method due to the low cost, stable performance and slight pollution. However, the microorganisms are prone to being intolerant to high-concentration industrial waste gas, which will result in large time consumption, low efficiency and even a failure in the treatment.

The biotrickling filter has been widely used in the degradation of VOCs because of its high activity and strong stability. However, its VOC removal efficiency is prone to being affected by various factors, such as intake air concentration, empty bed residence time, intake load, composition of the nutrient solution and packing height. In actual application, the biological membranes are usually poisoned by the high-concentration organic waste gas during at the beginning, resulting in an extended processing cycle. Therefore, there is an urgent need to develop a system and method for efficiently degrading VOCs.

SUMMARY

An object of this application is to provide a system and method for processing industrial waste gas based on a combination of photoelectrocatalysis and a biotrickling filter to overcome the defects in the prior art. The high-efficiency photocatalyst is activated by high-energy active substances generated from the plasma discharge and ultraviolet irradiation to pretreat the industrial waste gas, so as to reduce the concentration and simplify the composition of the industrial waste gas. The pre-treated industrial waste gas is further degraded in the biotrickling filter, allowing for shortened processing cycle and improved degradation efficiency.

The technical solutions of this application are described as follows.

In a first aspect, this application provides a system for processing industrial waste gas based on a combination of photoelectrocatalysis and a biotrickling filter, comprising:
an industrial waste gas simulation generator;
a photoelectrocatalytic reactor; and
at least one biotrickling filter;

wherein the industrial waste gas simulation generator, the photoelectrocatalytic reactor and the at least one biotrickling filter are communicated through pipelines; the industrial waste gas simulation generator comprises a first air pump, a stripping tower, a buffer tank and a mixing tank communicated via pipelines; a first flowmeter is provided on a pipeline between the first air pump and the stripping tower; an upper end of the stripping tower is provided with a liquid-feeding pipe equipped with a first valve; a second valve is provided on an upper end of the buffer tank, and a third valve is provided on an upper end of the mixing tank; one side of a lower portion of the buffer tank is connected to a waste water discharge pipe equipped with a fourth valve; the other side of the lower portion of the buffer tank is sequentially connected to a second flowmeter and a second pump via pipelines;

the photoelectrocatalytic reactor comprises a housing; a first plate-type catalyst, a plasma reactor a second plate-type catalyst and an ultraviolet lamp are provided in the housing in sequence along a horizontal direction; the first plate-type catalyst and the second plate-type catalyst are made by coating and drying a catalyst on a metal mesh plate; and the at least one biotrickling filter comprises a packing column and a circulating liquid storage tank arranged in sequence from top to bottom; the packing column and the circulating liquid storage tank are connected via a pipeline equipped with a fifth valve; an upper end of the packing column is provided with a gas-discharging port equipped with a sixth valve; and a filler is packed inside the packing column; a lower end of the packing column is communicated to a third flowmeter, a seventh valve and the photoelectrocatalytic reactor in sequence via pipelines; a position where the lower end of the packing column communicates with the photoelectrocatalytic reactor is close to a lower end of the ultraviolet lamp; an intake sampling port is arranged on a pipeline between the packing column and the third flowmeter; a liquid-feeding port is arranged on an upper end of the circulating liquid storage tank; one side of a lower portion of the circulating liquid storage tank is provided with a drain pipe equipped with a eighth valve; the other side of the lower portion of the circulating liquid storage tank is communicated to a micro water pump and a fourth flowmeter through a connecting pipe; an end of the connecting pipe far away from the circulating liquid storage tank penetrates a side wall of the packing column and extends into the packing column; and the end of the connecting pipe extending into the packing column is provided with a spray nozzle; and the side wall of the packing column between the spray nozzle and the gas-discharging pipe is provided with an outlet sampling pipe.

In some embodiments, the system comprises three biotrickling filters; wherein the three biotrickling filters are connected in series with the photoelectrocatalytic reactor through pipelines; and the three biotrickling filters are a primary biotrickling filter, a secondary biotrickling filter and a tertiary biotrickling filter, respectively.

In some embodiments, the catalyst is $Bi_2WO_6$.

In some embodiments, two pieces of the filler are provided inside the packing column, and a porous bearing plate is provided below each of the two pieces of the filler; and the filler is prepared by mixing polyurethane cotton and hollow spheres in a volume ratio of 1:1. The porous bearing plate is configured to protect the filler from falling off and enable the gas and nutrient solution to pass easily.

In some embodiments, a height difference between the gas-discharging port and buildings surrounding the same is equal to or larger than 15 m.

In a second aspect, this application provides a method for processing the industrial waste gas using the above system 1, comprising:

allowing the industrial waste gas to enter the buffer tank from the stripping tower; regulating the second valve of the buffer tank to ensure uniform and stable flow and intake loading of the industrial waste gas, wherein the second valve also plays a role in separating liquid from gas;

discharging waste water generated in the buffer tank through the waste water discharge pipe, wherein the waste water is further transported to a sewage treatment plant of a factory for treatment; allowing the industrial waste gas flowing out of the buffer tank to enter the mixing tank; mixing the industrial waste gas with air in the mixing tank to dilute the industrial waste gas and reduce an intake loading of the photoelectrocatalytic reactor; and allowing the diluted industrial waste gas flowing out of the mixing tank to enter the photoelectrocatalytic reactor; turning on the photoelectrocatalytic reactor to pretreat the diluted industrial waste gas, wherein the plasma generator is configured to activate and change reduction performance of the catalyst to improve dispersibility, specific surface area, and adsorption and desorption performances of the catalyst; an irradiation of the ultraviolet lamp further activates the catalyst; and most of the diluted industrial waste gas is decomposed into carbon dioxide, water and nitrogen;

turning on the at least one biotrickling filter; allowing the pretreated industrial waste gas to flow out of the photoelectrocatalytic reactor to enter the packing column; treating the pretreated industrial waste gas with microorganisms on the filler, wherein the pretreated industrial waste gas provides carbon energy for the microorganisms, and the nutrient solution in the circulating liquid storage tank is transported through the micro water pump and sprayed onto the filler to provide the microorganisms with nutrients and water; and excess nutrient solution accumulated at a bottom of the packing column is recovered to the circulating liquid storage tank; and discharging the treated waste gas to atmosphere through the gas-discharging port.

In some embodiments, the nutrient solution in the circulating liquid storage tank comprises 0.03 mg/L of $MgSO_4$, 0.42 mg/L of $CoCl_2·6H_2O$, 0.05 mg/L of $AlCl_3·6H_2O$, 0.0067 g/L of $MgSO_4$, 0.13 mg/L of $MnSO_4·H_2O$, 0.15 mg/L of $Na_2MoO_4·2H_2O$, 0.14 g/L of $K_2HPO_4$, 0.04 g/L of $KH_2PO_4$, 0.01 g/L of $(NH_4)_2SO_4$ and 0.08 mg/L of glucose, and has a pH of 7.0-8.0.

In some embodiments, the microorganisms are *Bacillus* strains.

Compared to the prior art, this application has the following beneficial effects.

(1) High removal efficiency

Based on the combination of photoelectrocatalysis and the biotrickling filter, this application can efficiently remove the inorganic pollutants, organic pollutants and volatile organic compounds in the industrial waste gas, and the removal rate can reach 100%.

(2) High load

A photoelectrocatalytic approach is adopted to pretreat the industrial waste gas to weaken the intake load of the biotrickling filter.

(3) In the system provided herein, the industrial waste gas is pretreated by a photoelectrocatalytic reactor prior to entering the biotrickling filter, which facilitates alleviating the toxic effect of high-concentration industrial waste on microorganisms, shortening the operation time and improving the efficiency of the biotrickling filter, and avoiding the failure during the operation.

Figure 1:
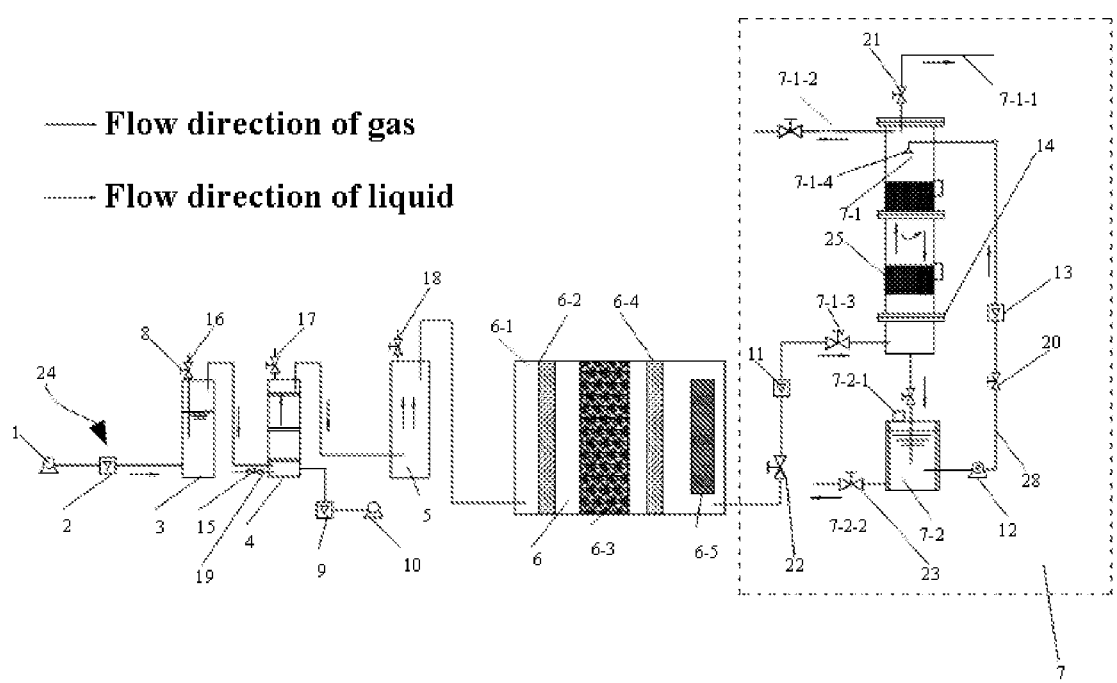
FIG. 1 is a schematic diagram of a system for processing industrial waste gas by combination of photoelectrocatalysis and biotrickling filter according to an embodiment of the present disclosure.

In the drawings, 1, first air pump; 2, first flowmeter; 3, stripping tower; 4, buffer tank; 5, mixing tank; 6, photoelectrocatalytic reactor; 6-1, housing; 6-2, first plate-type catalyst; 6-3, plasma reactor; 6-4, second plate-type catalyst; 6-5, ultraviolet lamp; 7, biotrickling filter; 7-1, packing column, 7-1-1, gas-discharging port; 7-1-2, outlet sampling pipe; 7-1-3, intake sampling port; 7-1-4, spray nozzle; 7-2, circulating liquid storage tank; 7-2-1, liquid-feeding port; 7-2-2, drain pipe; 8, liquid-feeding pipe; 9, second flowmeter; 10, second air pump; 11, third flowmeter; 12, micro water pump; 13, fourth flowmeter; 14, porous bearing plate; 15, waste water discharge pipe; 16, first valve; 17, second valve; 18, third valve; 19, fourth valve; 20, fifth valve; 21, sixth valve; 22, seventh valve; 23, eighth valve; 24, industrial waste gas simulation generator; 25, filler; 26, catalyst; 27, metal mesh plate; 28, connecting pipe; 29, primary biotrickling filter; 30, secondary biotrickling filter; and 31, tertiary biotrickling filter.

DETAILED DESCRIPTION OF EMBODIMENTS

Embodiment 1

As shown in FIG. 1, a system for processing industrial waste gas based on a combination of photoelectrocatalysis and a biotrickling filter includes an industrial waste gas simulation generator 24, a photoelectrocatalytic reactor 6 and at least one biotrickling filter 7 communicated through pipelines.

The industrial waste gas simulation generator 24 includes a first air pump 1, a stripping tower 3, a buffer tank 4 and a mixing tank 5 communicated via pipelines. A first flowmeter 2 is provided on a pipeline between the first air pump 1 and the stripping tower 3. An upper end of the stripping tower 3 is provided with a liquid-feeding pipe 8 equipped with a first valve 16. A second valve 17 is provided on an upper end of the buffer tank 4, and a third valve 18 is provided on an upper end of the mixing tank 5. One side of a lower portion of the buffer tank 4 is connected to a waste water discharge pipe 15 equipped with a fourth valve 19, and the other side of the lower portion of the buffer tank 4 is sequentially connected to a second flowmeter 9 and a second pump 10 via pipelines.

The photoelectrocatalytic reactor 6 includes a housing 6-1. A first plate-type catalyst 6-2, a plasma generator 6-3, a second plate-type catalyst 6-4 and an ultraviolet lamp 6-5 are provided in the housing in sequence along a horizontal direction. The first plate-type catalyst 6-2 and the second plate-type catalyst 6-4 are made by coating and drying a catalyst 26 on a metal mesh plate 27.

The biotrickling filter 7 includes a packing column 7-1 and a circulating liquid storage tank 7-2 arranged in sequence from top to bottom. The packing column 7-1 and the circulating liquid storage tank 7-2 are connected via a pipeline equipped with a fifth valve 20. An upper end of the packing column 7-1 is provided with a gas discharge pipe 7-1-1 equipped with a sixth valve 21, and a filler 25 is packed inside the packing column 7-1. A lower end of the packing column 7-1 is communicated to a third flowmeter 11, a seventh valve 22 and the photoelectrocatalytic reactor 6 in sequence via pipelines. A position where the lower end of the packing column 7-1 communicates with the photoelectrocatalytic reactor 6 is close to a lower end of the ultraviolet lamp 6-5. An intake sampling port 7-1-3 is arranged on a pipeline between the packing column 7-1 and the third flowmeter 11. A liquid-feeding port 7-2-1 is arranged on an upper end of the circulating liquid storage tank 7-2. One side of a lower portion of the circulating liquid storage tank is provided with a drain pipe 7-2-2 equipped with a eighth valve 23, and the other side of the lower portion of the circulating liquid storage tank 7-2 is communicated with a micro water pump 12 and a fourth flowmeter 13 through a connecting pipe 28. An end of the connecting pipe 28 far away from the micro water pump 12 penetrates a side wall of the packing column 7-1 and extends into the packing column 7-1, and the end of the connecting pipe 28 extending into the packing column is provided with a spray nozzle 7-1-4. The side wall of the packing column between the spray nozzle 7-1-4 and the gas-discharging port 7-1-1 is provided with an outlet sampling pipe 7-1-2. The catalyst 26 is $Bi_2WO_6$. Two pieces of the filler 25 are provided inside the packing column 7-1, and a porous bearing plate 14 is provided below each of the two pieces of the filler 25, and the filler 25 is prepared by mixing polyurethane cotton and hollow spheres in a volume ratio of 1:1. A height difference between the gas-discharging port 7-1-1 and buildings surrounding the same was equal to or larger than 15 m.

As provided herein, the system merely includes one biotrickling filter 7. In some embodiments, a plurality of biotrickling filters 7 can be used in series to improve the purification effect, for example, three biotrickling filters 7 are connected in series with the photoelectrocatalytic reactor 6 through pipelines; and the three biotrickling filters 7 are a primary biotrickling filter 29, a secondary biotrickling filter 30 and a tertiary biotrickling filter 31, respectively.

Figure 2:
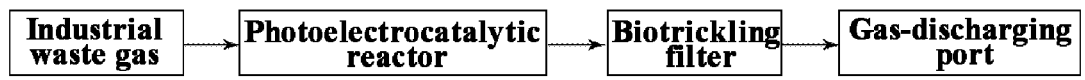
FIG. 2 is a flow diagram of a process of treating industrial waste gas using the system according to an embodiment of the present disclosure.

As shown in FIG. 2, a method for processing the industrial waste gas using the above system is described as follows.

The industrial waste gas enters the buffer tank 4 from the stripping tower 3. The second valve of the buffer tank 4 is regulated to ensure uniform and stable flow and intake loading of the industrial waste gas, and the second valve 17 also plays a role in separating liquid from gas.

Waste water generated in the buffer tank 4 is discharged through the waste water discharge pipe 15, in which the waste water is further transported to a sewage treatment plant of a factory for treatment. The industrial waste gas flowing out of the buffer tank 4 enters the mixing tank 5, and is mixed with air in the mixing tank 5 to be diluted and reduce an intake loading of the photoelectrocatalytic reactor 6. The diluted industrial waste gas flowing out of the mixing tank 5 enters the photoelectrocatalytic reactor 6. Then the photoelectrocatalytic reactor 6 is turned on to pretreat the diluted industrial waste gas, in which the plasma generator 6-3 is configured to activate and change reduction performance of the catalyst 26 to improve dispersibility, specific surface area, and adsorption and desorption performances of the catalyst. An irradiation of the ultraviolet lamp 6-5 further activates the catalyst, and most of the diluted industrial waste gas is decomposed into carbon dioxide, water and nitrogen;

The biotrickling filter 7 is turned on, and the pretreated industrial waste gas flows out of the photoelectrocatalytic reactor 6 to enter the packing column 7-1. The pretreated industrial waste gas is treated with microorganisms on the filler 25, in which the pretreated industrial waste gas provides carbon energy for the microorganisms, and the nutrient solution in the circulating liquid storage tank 7-2 is transported through the micro water pump 12 and sprayed onto the filler 25 to provide the microorganisms with nutrients and water. The excess nutrient solution accumulated at a bottom of the packing column 7-1 is recovered to the circulating liquid storage tank 7-2, and the treated waste gas is discharged to atmosphere through the gas-discharging port 7-1-1.

Embodiment 2

The toluene-containing waste gas discharged from the laboratory was treated herein.

1000 $mg/m^3$ of the toluene-containing waste gas was passed into the photoelectrocatalytic reactor 6. A plasma $Bi_2WO_6$ was activated under the irradiation of the ultraviolet lamp 6-5 to catalyze the degradation of the waste gas, and then the treated waste gas was allowed to enter the biotrickling filter 7 inoculated with *Bacillus* strains.

Figure 3:
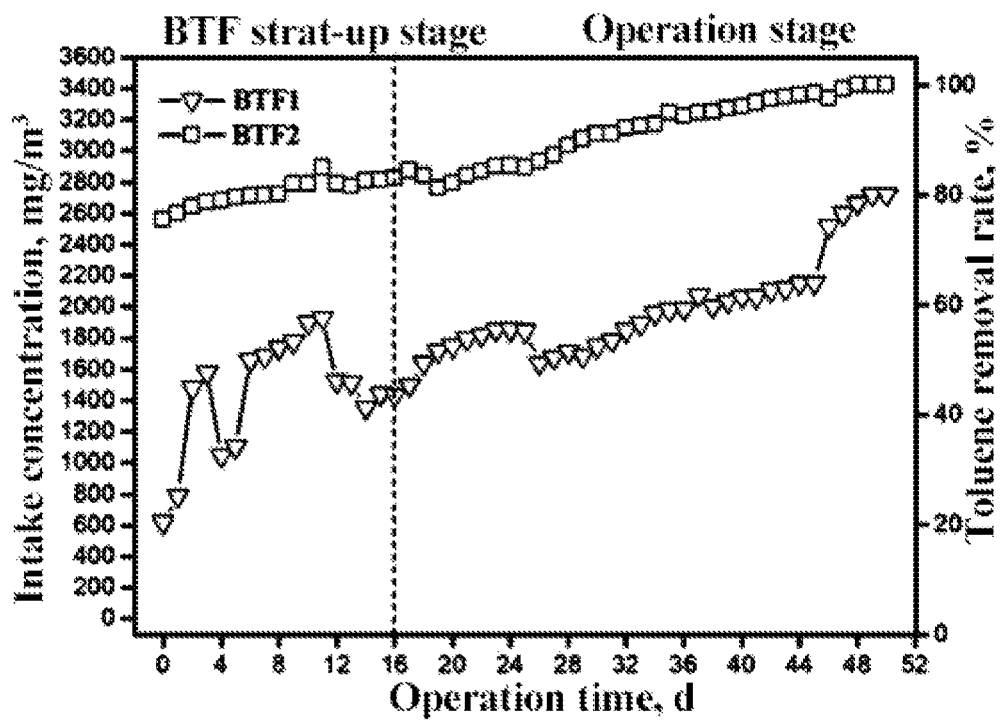
FIG. 3 shows a comparison of treatment effects of a biotrickling filter used in combination with a photoelectrocatalytic reactor or used alone on a toluene-containing waste gas.
Figure 4:
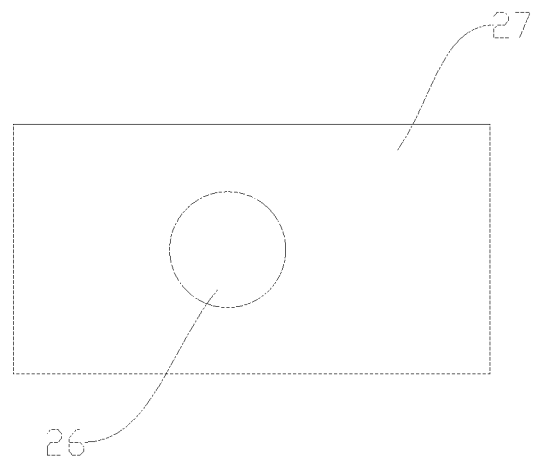
FIG. 4 schematically depicts a structure of a plate-type catalyst according to an embodiment of the present disclosure.
Figure 5:
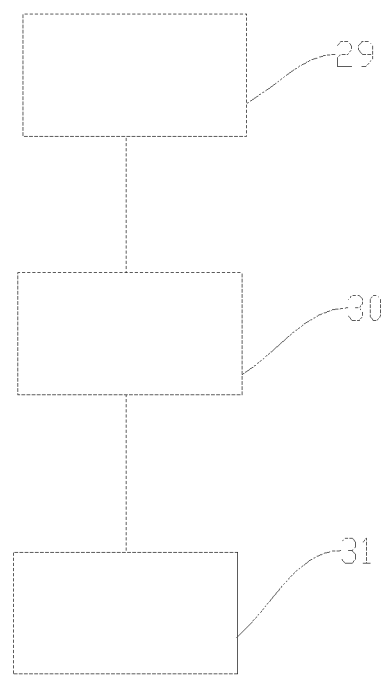
FIG. 5 is a schematic diagram of a structure of biotrickling filters according to an embodiment of the present disclosure.

As shown in FIG. 3, BTF1 represented the toluene removal rate curve obtained under the separate use of the biotrickling filter 7, and BTF2 was the toluene removal rate curve made under the combined use of the biotrickling filter 7 and the photoelectrocatalytic reactor 6. It can be seen from FIG. 3 that after the biotrickling filter 7 was started, the curve BTF1 experienced a large fluctuation, which indicated that the microorganisms were poisoned by the toluene-containing waste gas directly entering the biotrickling filter 7, attenuating the toluene removal effect. By contrast, the curve BTF2 exhibited a gradually increasing trend, which indicated that the toxic effect of the toluene-containing waste gas pretreated by the photoelectrocatalytic reactor 6 on microorganisms was greatly attenuated, allowing for improved toluene removal rate. In summary, the toluene removal rate obtained under the combined use of the biotrickling filter 7 and the photoelectrocatalytic reactor 6 was greatly improved, which was 19.79% higher than that of the control, and reached 100% after 50 days.

What is claimed is:

1. A system for processing industrial waste gas based on a combination of photoelectrocatalysis and a biotrickling filter, comprising:
  an industrial waste gas simulation generator;
  a photoelectrocatalytic reactor; and
  at least one biotrickling filter;
  wherein the industrial waste gas simulation generator, the photoelectrocatalytic reactor generator and the at least one biotrickling filter are communicated through pipelines; the industrial waste gas simulation generator comprises a first air pump, a stripping tower, a buffer tank and a mixing tank communicated via pipelines; a first flowmeter is provided on a pipeline between the first air pump and the stripping tower; an upper end of the stripping tower is provided with a liquid-feeding pipe equipped with a first valve; a second valve is provided on an upper end of the buffer tank, and a third valve is provided on an upper end of the mixing tank; one side of a lower portion of the buffer tank is connected to a waste water discharge pipe equipped with a fourth valve; the other side of the lower portion of the buffer tank is sequentially connected to a second flowmeter and a second pump via pipelines;

the photoelectrocatalytic reactor comprises a housing; a first plate-type catalyst, a plasma generator, a second plate-type catalyst and an ultraviolet lamp are provided in the housing in sequence along a horizontal direction; the first plate-type catalyst and the second plate-type catalyst are made by coating and drying a catalyst on a metal mesh plate; and the at least one biotrickling filter comprises a packing column and a circulating liquid storage tank arranged in sequence from top to bottom; the packing column and the circulating liquid storage tank are connected via a pipeline provided with a fifth valve; an upper end of the packing column is provided with a gas-discharging port equipped with a sixth valve; and a filler is arranged packed inside the packing column; a lower end of the packing column is communicated to a third flowmeter, a seventh valve and the photoelectrocatalytic reactor in sequence via pipelines; a position where the lower end of the packing column communicates with the photoelectrocatalytic reactor is close to a lower end of the ultraviolet lamp; an intake sampling port is arranged on a pipeline between the packing column and the third flowmeter; a liquid-feeding port is arranged on an upper end of the circulating liquid storage tank; one side of a lower portion of the circulating liquid storage tank is provided with a drain pipe equipped with an eighth valve; the other side of the lower portion of the circulating liquid storage tank is communicated to a micro water pump and a fourth flowmeter through a connecting pipe; an end of the connecting pipe far away from the circulating liquid storage tank penetrates a side wall of the packing column and extends into the packing column; and the end of the connecting pipe extending into the packing column is provided with a spray nozzle; and the side wall of the packing column between the spray nozzle and the gas-discharging port is provided with an outlet sampling pipe.

2. The system of claim 1, comprising three biotrickling filters;
wherein the three biotrickling filters are connected in series with the photoelectrocatalytic reactor through pipelines; and the three biotrickling filters are a primary biotrickling filter, a secondary biotrickling filter and a tertiary biotrickling filter, respectively.

3. The system of claim 1, wherein the catalyst is $Bi_2WO_6$.

4. The system of claim 1, wherein two pieces of the filler are provided inside the packing column, and a porous bearing plate is provided below each of the two pieces of the filler; and the filler is prepared by mixing polyurethane cotton and hollow spheres in a volume ratio of 1:1.

5. A method for processing industrial waste gas using the system of claim 1, comprising:
allowing the industrial waste gas to enter the buffer tank from the stripping tower; regulating the second valve of the buffer tank to ensure uniform and stable flow and intake loading of the industrial waste gas, wherein the second valve also plays a role in separating liquid from gas;

discharging waste water generated in the buffer tank through the waste water discharge pipe, wherein the waste water is further transported to a sewage treatment plant of a factory for treatment; allowing the industrial waste gas flowing out of the buffer tank to enter the mixing tank; mixing the industrial waste gas with air in the mixing tank to dilute the industrial waste gas and reduce an intake loading of the photoelectrocatalytic reactor; and allowing the diluted industrial waste gas flowing out of the mixing tank to enter the photoelectrocatalytic reactor; turning on the photoelectrocatalytic reactor to pretreat the diluted industrial waste gas, wherein the plasma generator is configured to activate and change reduction performance of the catalyst to improve dispersibility, specific surface area, and adsorption and desorption performances of the catalyst; an irradiation of the ultraviolet lamp further activates the catalyst; and most of the diluted industrial waste gas is decomposed into carbon dioxide, water and nitrogen;

turning on the at least one biotrickling filter; allowing the pretreated industrial waste gas to flow out of the photoelectrocatalytic reactor to enter the packing column; treating the pretreated industrial waste gas with microorganisms on the filler, wherein the pretreated industrial waste gas provides carbon energy for the microorganisms, and the nutrient solution in the circulating liquid storage tank is transported through the micro water pump and sprayed onto the filler to provide the microorganisms with nutrients and water; and excess nutrient solution accumulated at a bottom of the packing column is recovered to the circulating liquid storage tank; and discharging the treated waste gas to atmosphere through the gas-discharging port.

6. The method of claim 5, wherein the nutrient solution in the circulating liquid storage tank comprises 0.03 mg/L of $MgSO_4$, 0.42 mg/L of $CoCl_2 \cdot 6H_2O$, 0.05 mg/L of $AlCl_3 \cdot 6H_2O$, 0.13 mg/L of $MnSO_4 \cdot H_2O$, 0.15 mg/L of $Na_2MoO_4 \cdot 2H_2O$, 0.14 g/L of $K_2HPO_4$, 0.04 g/L of $KH_2PO_4$, 0.01 g/L of $(NH_4)_2SO_4$ and 0.08 mg/L of glucose, and has a pH of 7.0-8.0.

7. The method of claim 5, wherein the microorganisms are *Bacillus* strains.

* * * * *